Patented Jan. 10, 1933

1,894,247

UNITED STATES PATENT OFFICE

GEORGE B. WALDEN, OF SOUTHPORT, INDIANA, ASSIGNOR TO ELI LILLY AND COMPANY, OF INDIANAPOLIS, INDIANA, A CORPORATION OF INDIANA

THERAPEUTIC COMPOUND AND PROCESS OF PRODUCING IT

No Drawing.   Application filed January 9, 1932. Serial No. 585,799.

It is the object of my invention to increase the physiological effects resulting from the administration of tissues of the class comprising liver and kidney, or of products derived from such tissues, in the treatment of various diseases. This is of marked advantage in the treatment of certain anemias, and more especially pernicious anemia.

It is known (Minot and Murphy, Whipple, and others) that whole liver and kidney are effective in the treatment of anemias generally, both secondary anemia and pernicious anemia. It is also known (Cohen, Campbell, Walden) that certain fractions of these tissues are obtainable that are effective respectively in the treatment of secondary anemia and of pernicious anemia. It is also known (Sturgis and Isaacs) that whole stomachs and stomach linings are effective in the treatment of anemia, and more particularly pernicious anemia.

Further, it is known (Castle) that beef muscles and stomach secretions are not effective separately in the treatment of pernicious anemia, but that a product obtained by mixing beef muscle and stomach secretions and digesting the mixture at an appropriate hydrogen ion concentration is effective in such treatment, whether such digestion is carried on externally of the patient's body on an externally made mixture of such muscle and such stomach secretions, or is carried on within the patient's stomach on a mixture resulting upon separate feeding of such muscle and such stomach secretions simultaneously or sufficiently nearly simultaneously so that interaction occurs between the muscle and the secretions. These things are described by Castle in an article in the American Journal of Medical Sciences for December, 1929. It had earlier been reported by Castle at the meeting of the American Society for Clinical Investigation at Washington on April 30, 1928, that beef muscle ground up and fed to a normal person, and allowed to digest in the stomach of that person for a few hours, could then be removed from the stomach of that person and was effective by oral administration in the treatment of pernicious-anemia patients. It was also shown by Castle that stomach secretions, orally administered alone, are not effective in the treatment of pernicious anemia; and that a treatment is not effective in relieving pernicious anemia if stomach secretions and beef muscles are orally administered to the patient at sufficiently widely separated times to permit the material first so administered to leave the stomach before the second is administered, as for instance by administration of one early in the morning and of the other in the afternoon.

The use of stomachs as a digestive has also long been known. For example, the original commercial pepsin was merely the dried lining or mucous membrane of the stomach. See Thorpe's Dictionary of Applied Chemistry, (1913,) vol. 4, p. 112; and American Dispensatory, (15th edition, 1886,) by John King and John U. Lloyd, p. 120. The ordinary present-day commercial pepsin (of the United States Pharmacopoeia), however, is not the mere dried lining or mucous membrane of the stomach; but is a water-soluble product derived therefrom, by fluid-extraction after autolysis, to contain in a more concentrated and purified form the proteolytic enzyme, itself also called pepsin, which digests egg-white under acid conditions and has little or no activity at neutrality. It has been shown that such present-day commercial pepsin is not only not effective itself to relieve pernicious anemia but cannot be substituted for stomach secretions to cooperate with beef muscle to produce a product which is effective in the treatment of pernicious anemia. (Castle, Wilkinson.)

According to what I deem the best mode of carrying out my invention, I mix extracorporeally (outside of the living body) a tissue of the class comprising liver and kidney, or material derived therefrom, with a suitable digestive agent to get accelerated digestion, desirably a material containing the stomach secretions, such for instance as stomachs, stomach linings, or the juices expressed from stomachs or stomach linings, or a material having like digestive action, to produce a product which when administered orally is more effective in the treatment of pernicious anemia than the sum of the effects of the ingredients of the mixture. Such a digestive agent contains enzymes, and is probably enzymatic in its action on the liver or kidney. In consequence, as in other enzymatic reactions, the amount of digestive agent present may be small in relation to the amount of material being digested—in this case liver or kidney or material derived therefrom. The stomach-tissue-derived enzyme (if it actually is an enzyme) which is effective in the digestion I obtain of tissue-material of the class comprising liver and kidney is not merely the enzyme called pepsin, which digests egg-white, although perhaps it is quite closely associated therewith; but is one which acts not only under acid conditions but also under neutral conditions on such tissue-material of the class comprising liver or kidney to produce an enhanced pernicious-anemia effectiveness, and the pepsin-enzyme alone will not do this.

This mixture may be orally administered directly as such; but is preferably caused to digest under proper conditions to change the ingredients by the digestive action. The digested mixture may be orally administered directly as such; but is desirably fractionated, as by having water and/or fats suitably removed. Both the undigested mixture and the digested mixture are highly effective when so administered, especially in pernicious anemia. Potent liquid extracts, as by extraction with water, may also be prepared at any stage.

The following is an example of a preparation made in accordance with my invention, using liver as a main ingredient. Instead of liver, kidney may be substituted; or a mixture of both of these tissues may be used; or extracts of either or both of these tissues may be used. This example is given merely by way of illustration and not by way of limitation, as many variations may be made.

*Example.*—10 lbs. of whole stomachs are ground up fine, and mixed with 20 to 100 lbs., or more, of finely minced livers. Conveniently both the stomachs and the livers are from hogs; but it is not necessary that either be from hogs, or that both be from the same species of animal. This mixture, dried and/or defatted if desired, may be administered orally with excellent effect.

I prefer, however, to permit digestion first. This digestion is desirably under acid conditions, conveniently between pH 3 and pH 6; but any hydrogen ion concentration may be used in which the digestive agent will function. If acid is added, I regard hydrochloric acid as preferable; but other acids may be used, as for instance sulphuric acid. Water may be added, either before or after the adjustment of hydrogen ion concentration, if desired, but this is not necessary. The mixture is gently digested for two to four hours, or even somewhat longer, in any suitable apparatus, desirably at a temperature below 40° C., and preferably at about body temperature. The digestion is desirably a matter of hours, and not a matter of days. Following the digestion, the mixture is fractionated by the removal of certain inert materials, such as water and/or fats, as by evaporation at low temperature and/or extraction with petroleum ether.

The mixture may be used at any stage after the mixing. In the treatment of anemia, particularly pernicious anemia, it is found to have an increased potency over the sum of the potencies of the original ingredients administered individually at separated times. Thus, the mixture may be orally administered when only the mixing has been done; or when only mixing, and drying and/or defatting, has been done; or when only the mixing and the digesting has been done; or when the mixing, digesting, and fractionating have all been done. For instance, if it was found that a certain beneficial effect is obtained by the oral administration of 150 g. of original stomach, or of 200 g. of original liver, an equal effect may be produced by the oral administration of only 50 g. of the mixture, or even less. This makes an increased effectiveness of at least three or four fold. So far as I am aware, this is the first liver-source material the potency of which in the treatment of pernicious anemia by oral administration is substantially in excess of that of the original raw liver.

Instead of using whole stomachs, I may use stomach linings. Instead of using either, I may use any stomach-derived material which produces the desired digestion of or interaction with the liver to produce a material of enhanced pernicious anemia effectiveness; such as digestive juices of the stomach, obtained in any suitable way from the stomach, and desirably obtained by expressing such juices from whole stomachs or from stomach linings, or a stomach fraction containing agents which produce the desired digestion or interaction. So by the term "effective stomach-tissue material", as used in the claims, I mean any of the following: whole stomachs, stomach linings, and those extracts of whole stomachs and of stomach linings and those digestive juices of the stomach which interact with liver to produce a material of enhanced pernicious-anemia effectiveness; but I do not mean the present-day commercial pepsin (of the U. S. Pharmacopoeia). Although the pepsin-enzyme is usually present in such effective stomach-tissue material, the enhancing effect on the pernicious-anemia effectiveness of liver or kidney and the pepsin effect vary widely in their relation to each other. Often stomach-tissue material which is very effective to enhance such pernicious-anemia effectiveness of liver or kidney is relatively low in pepsin potency as determined by the power to digest egg-white, and vice versa.

Similarly, or also, instead of using whole livers or whole kidneys, I may use any liver-derived or kidney-derived material which when acted upon by the digestive agent (effective stomach-tissue material) gives a product of increased potency in the treatment of pernicious anemia by oral administration. I include all these in the term "tissue-material of the class comprising liver and kidney."

Thus, for instance, a mixture may be made of dried stomachs, or dried stomach linings or scrapings (crude pepsin), with separately dried liver or kidney or those dried fractions of liver or kidney which by reason of such admixture exhibit increased potency on oral administration in pernicious anemia.

Potent liquid extracts, as with water, may be made of the product at various stages after the mixture of stomach or stomach-derived material with liver, kidney, or liver-derived or kidney-derived material has been made. Such a liquid extract may be administered either parenterally or orally.

As an example: 1000 g. of the dried digested mixture of stomach and liver is extracted with water, desirably 5 to 10 liters, at about room temperature. The water extract thus obtained contains about 35% of the solids of the digested mixture, but about 90% of its pernicious-anemia potency on oral administration. The water extract, desirably after adequate filtration, may be administered parenterally, with good effect.

By "digesting" as used in this application, I mean maintaining the material under such conditions that the substances present can somehow interact to give the increased pernicious-anemia potency. Desirably the conditions for digestion (interaction) are close to those existing in the normal stomach, with liquid present, an acidity of the order of pH 4 to pH 5, and a temperature in the neighborhood of body temperature (about 38° C.). The digestion (interaction) may or may not be an enzymatic action; but certainly it is not simple pepsin-enzyme digestion. Both mixing and digesting are preferably extracorporeal; but the digestion of my preferred stomach-liver mixture, save where otherwise specified, and indeed even the mixing thereof, may be carried out in the stomach of the patient.

I claim as my invention:

1. A product effective by oral administration in the treatment of certain anemias, which comprises a dehydrated mixture of effective stomach-tissue material and tissue-material of the class comprising liver and kidney, and which when administered orally is more effective in the treatment of pernicious anemia than the sum of the effects of the ingredients of the mixture.

2. A product effective by oral administration in the treatment of certain anemias, which comprises an extracorporeally digested mixture of effective stomach-tissue material and tissue-material of the class comprising liver and kidney, and which when administered orally is more effective in the treatment of pernicious anemia than the sum of the effects of the ingredients of the mixture.

3. A product effective by oral administration in the treatment of certain anemias, which comprises a concentrate of a mixture of effective stomach-tissue material and tissue-material of the class comprising liver and kidney, and which when administered orally is more effective in the treatment of pernicious anemia than the sum of the effects of the ingredients of the mixture.

4. A product effective by oral administration in the treatment of pernicious anemia, and comprising a mixture of effective stomach-tissue material and a pernicious-anemia-effective extract of tissue of the class comprising liver and kidney.

5. A product effective by oral administration in the treatment of certain anemias, and comprising a dehydrated mixture of stomach linings and tissue-material of the class comprising liver and kidney.

6. A product effective by oral administration in the treatment of pernicious anemia, and comprising a mixture of stomach linings and a pernicious-anemia-effective extract of tissue material of the class comprising liver and kidney.

7. The process of producing a material potent in the treatment of certain anemias, comprising mixing effective stomach-tissue material with tissue-material of the class comprising liver and kidney, and dehydrating the mixture.

8. The process of producing a material potent in the treatment of certain anemias, comprising mixing effective stomach-tissue material with tissue-material of the class comprising liver and kidney, and permitting the mixture to digest extracorporeally.

9. A product effective by oral administration in the treatment of pernicious anemia, and comprising a dehydrated mixture of whole-stomachs and tissue-material of the class comprising liver and kidney.

10. A product effective by oral administration in the treatment of pernicious anemia, and comprising a mixture of whole-stomachs and a pernicious-anemia-effective extract of tissue-material of the class comprising liver and kidney.

In witness whereof, I have hereunto set my hand at Indianapolis, Indiana, this 7th day of January, A. D. one thousand nine hundred and thirty-two.

GEORGE B. WALDEN.